United States Patent [19]
Ostrom

[11] 3,838,846
[45] *Oct. 1, 1974

[54] CONSTANT TENSION LINE-TENSIONING MECHANISM

[75] Inventor: Cyrus W. Ostrom, Seattle, Wash.

[73] Assignee: Consolidated Electric Corporation, Seattle, Wash.

[ * ] Notice: The portion of the term of this patent subsequent to Jan. 14, 1986, has been disclaimed.

[22] Filed: Apr. 23, 1973

[21] Appl. No.: 353,654

Related U.S. Application Data

[63] Continuation of Ser. No. 99,575, Dec. 18, 1970 abandoned.

[52] U.S. Cl. .................................. 254/172, 318/6
[51] Int. Cl. ............................................ B66d 1/48
[58] Field of Search ............ 254/172, 173 R, 173 B, 254/150 R, 186 R; 307/73; 318/6, 231

[56] References Cited
UNITED STATES PATENTS

| | | | |
|---|---|---|---|
| 1,551,419 | 8/1925 | Merrill | 254/172 |
| 3,421,736 | 1/1969 | Ostrom | 254/172 |

*Primary Examiner*—James B. Marbert
*Assistant Examiner*—James L. Rowland
*Attorney, Agent, or Firm*—Robert W. Beach

[57] ABSTRACT

Constant line tension can be maintained in a ship's mooring or towing line extending from a winch by supplying to a polyphase phase-wound induction motor driving the winch alternating current from an alternating-current source the frequency of which is variable in response to the load on the winch. Such variable-frequency source may be an alternator driven by a phase-wound induction machine powered to operate as a motor. The variable-frequency AC source is connected to the winch motor to drive the winch only in the reeling-in direction, but the tension on the line can retard the motor speed or stall the motor or rotate the winch and motor in the opposite, paying-out direction against the reeling-in driving torque of the motor. The winch motor torque can be adjusted by varying the value of resistance shunted across the rotor winding of the winch motor. The line can be retrieved very quickly by having a squirrel-cage alternating-current motor connected mechanically to the phase-wound induction machine. During constant-line-tension operation, such motor is simply idly rotated with such machine, but for rapid line retrieval the motor can be powered by the same AC supply as powers the phase-wound induction machine and such motor will then drive the phase-wound induction machine positively. The winch-motor torque can be adjusted by varying the value of resistance shunted across the rotor winding of the winch motor. Also, for towing applications the voltage of the variable-frequency source can be altered in response to variations in the length of line paid out or reeled in to control the winch motor in turn in response to sensing the extent of rotation of the winch drum in paying out or reeling in the towing line and correspondingly varying the field excitation of the alternating-current generator supplying current to the winch motor to operate the winch motor for restoring the line to its original length.

1 Claim, 4 Drawing Figures

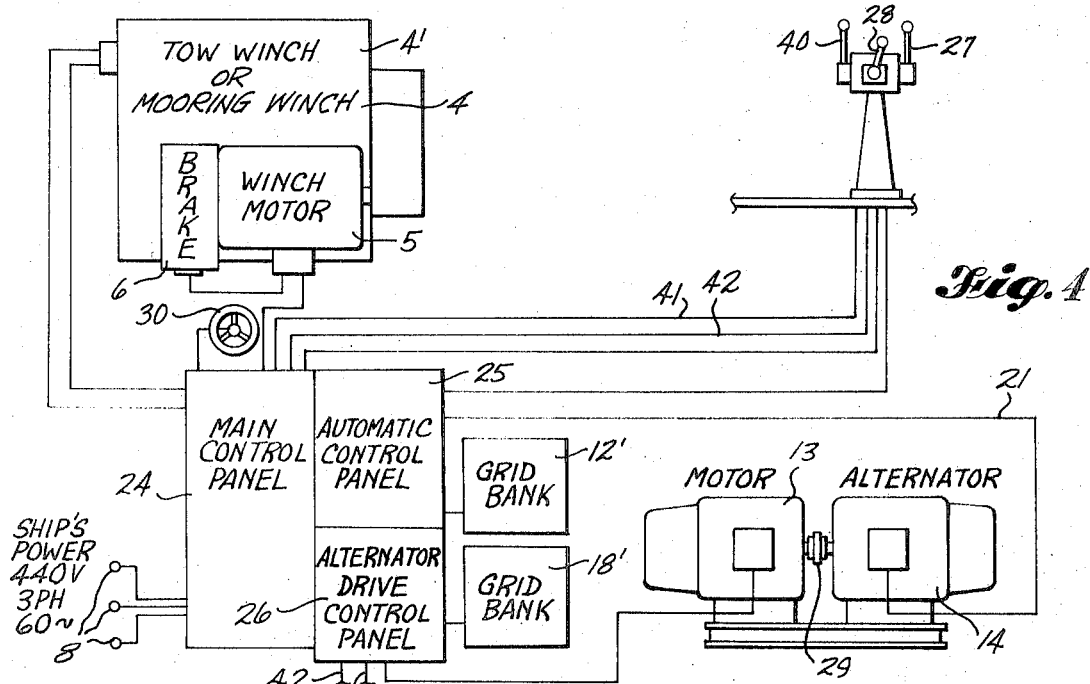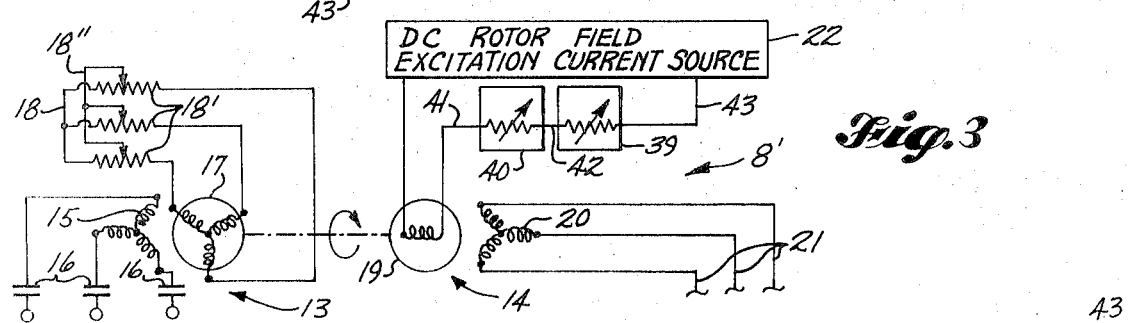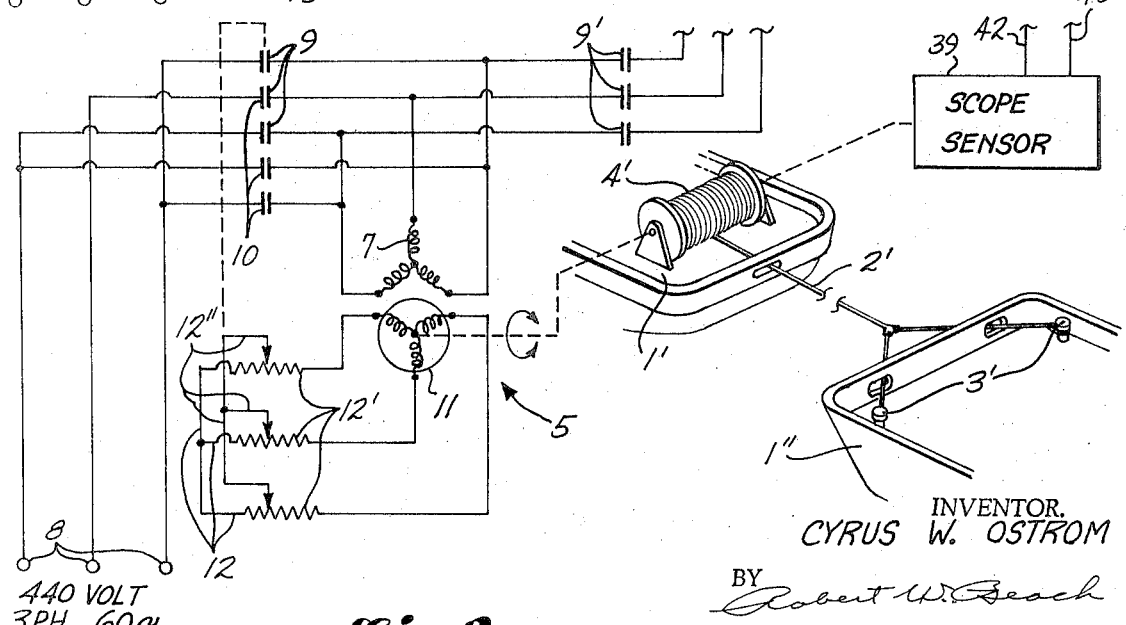

CONSTANT TENSION LINE-TENSIONING MECHANISM

This is a continuation of application Ser. No. 099,575, filed Dec. 18, 1970 now abandoned.

This invention relates to the general type of continual tension line-tensioning mechanism disclosed in U.S. Pat. No. 3,421,736, and the general purpose of the present invention is to make mechanism of that type more useful and versatile.

Especially it is an object of the present invention to enable mechanism of the general type disclosed in said U.S. Pat. No. 3,421,736 to be utilized for maintaining a substantially constant tension in a line connecting a tug and its tow as an operation alternative to using such mechanism for maintaining a substantially constant tension in a ship's mooring line.

Particularly when the mechanism is used in connection with a line for mooring a ship, but also when it is used in connection with a line for towing, it is an object to be able to override the automatic tension-control mechanism and to reel in line very rapidly when it has been cast off.

Principally when the mechanism is used for maintaining a constant tension in a towing line it is an object to be able to override the constant tension mechanism and limit the extent to which the line is reeled in or paid out from a reference length irrespective of the tension in the line.

An additional object is to be able to regulate at will the degree of variation in length of towing line which will be permitted by the mechanism.

FIG. 2 is a diagrammatic top perspective of the stern portion of a tug and the bow portion of a barge tow interconnected by a towing line in conjunction with a wiring diagram of a ship winch drive motor.

FIG. 3 is a wiring diagram of a power supply for the winch-driving motor of FIG. 2.

FIG. 4 is a diagram showing the relationship of and connections between various components of the mechanism including the winch, power supply for the winch and control mechanism for such power supply.

Figure 1:
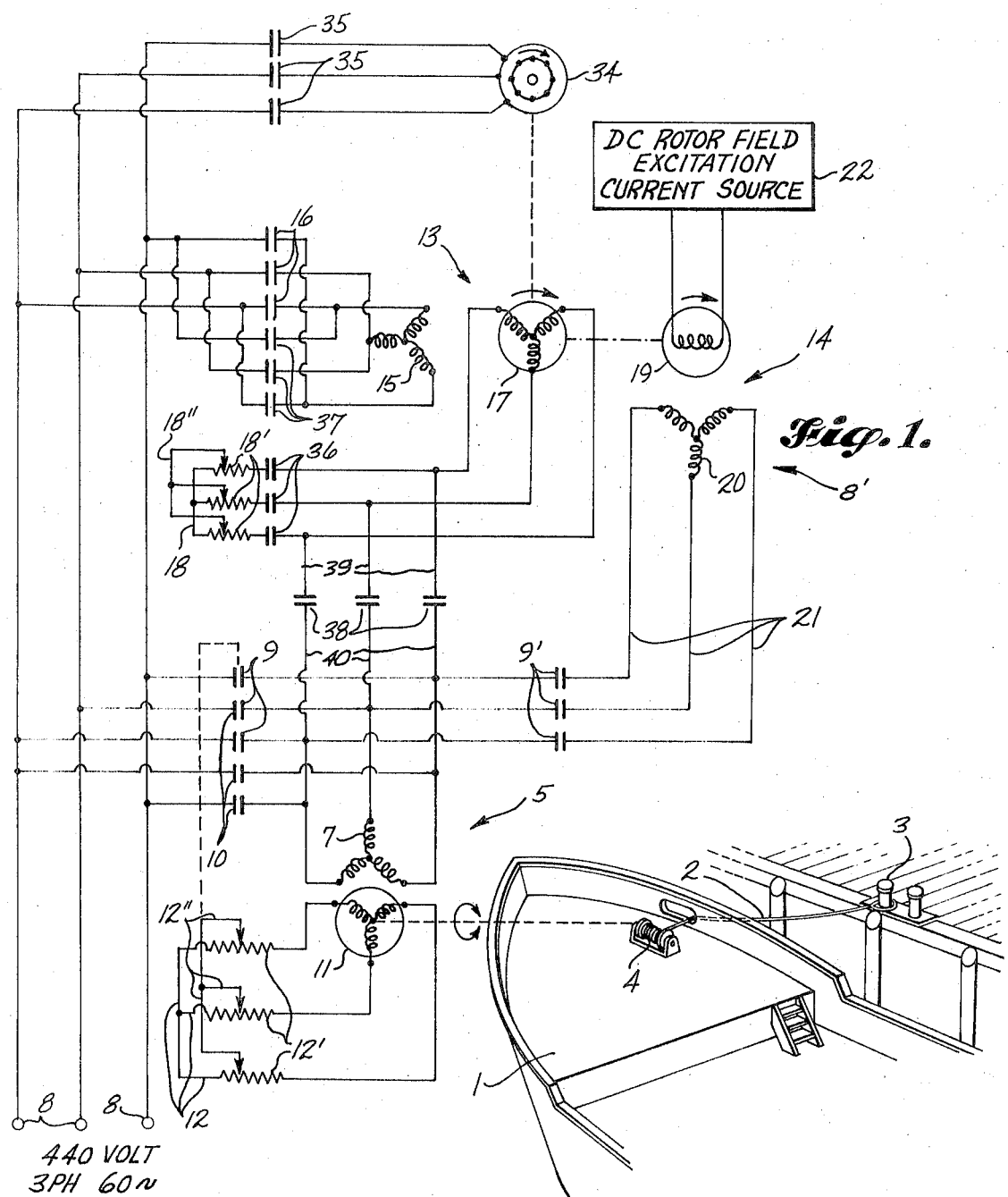
FIG. 1 is a diagrammatic top perspective of the bow portion of a ship and a dock portion to which the ship is moored in conjunction with the wiring diagram of a ship winch drive motor and a regulated power supply for such motor.

The mechanism illustrated in the drawings exerts on a line, such as a mooring line or a towing line of a ship, a selected substantially constant line tension. Such line-hauling mechanism can be controlled so that the tension on the line can be alerted at will to reel in or pay out the line and the speed of operation or torque of the line-winding means can be altered at will. This invention has particularly advantageous application to the winch of a ship mooring line or towing line and, consequently, the invention will be described with reference to these applications, although it will be understood that such mechanism can be used in any type of installation in which it is desired to maintain a substantially constant line tension where the variation in length of the line is limited.

In FIG. 1 of the drawings the foredeck of a ship 1 is illustrated from which a line 2 extends to a bollard 3 on a dock. The line 2 is tensioned by line-winding means, illustrated as a deck winch 4 to which a winch motor 5 is connected. When the winch motor is not in operation, the winch drum is secured against rotation by brake 6 as indicated in FIG. 4. Such brake can be of the drum and band type in which the brake band is held in position clamping the brake drum by compression spring means. The clamping action of the brake drum is released automatically by an electric solenoid connected in circuit with the winch motor 5 so that when the winch motor is energized the brake solenoid will be energized simultaneously to release the braking action. Correspondingly, when the winch driving motor is de-energized the brake-releasing solenoid will be deenergized so that the brake band will be clamped by its spring to the brake drum so as to secure the winch drum against rotation.

The winch motor 5 is of the polyphase phase-wound induction type, including a three-phase Y-connected stator winding 7. During a mooring operation this winding can be connected to a constant frequency AC source 8, which may be the ship AC supply. Such supply may, for example, be of the three-phase 60 cycles-per-second type having 440 voltage. Such AC source can be connected through a starting switch 9 in such phase relationship to the stator winding 7 as to energize the motor to turn in the direction for driving the winch drum 4 to reel in the mooring line. Conversely, the such source can be connected in a different phase relationship through reversing switch 10 to the stator winding 7 of the motor so as to cause the rotor of the motor to turn in a direction such that the winch drum 4 pays out mooring line 2.

While the starting switches 9 and 10 determine in which direction the winch motor 5 and the drum of winch 4 will turn, the speed and torque of the motor in either direction will be determined by the manner in which the phase-wound coils of the rotor 11 are connected together. Such rotor windings are interconnected by wires 12, but such wires include in them slide-wire resistances 12' which can be bridged at different locations by a set of interconnected adjustable brushes 12". These brushes can be moved conjointly along the slide wires 12' in corresponding positions, or the connections to the resistances can be in the form of taps and connectors can connect together corresponding taps of the respective resistances 12' to provide an equivalent variation in resistance value.

To operate the winch 4 in a normal operation effecting mooring of a ship, therefore, the switch 9 can be closed to energize the motor 5 for reeling in the mooring line 2 or the switch 10 can be closed to energize the motor 5 for driving the winch 4 to pay out the line 2 and the bridging connections 12" can be set to decrease the effective resistance in the rotor connections for increasing the speed and/or torque of the motor to any desired value within the capability of the motor. When the ship has been brought into its desired mooring position the switches 9 and 10 are opened and the switch 9' is closed to connect the stator winding 7 of the winch motor 5 continuously to a load-responsive variable-frequency AC source 8' instead of to the constant-frequency AC source 8 to which the motor was connected by the switch 9 or the switch 10, to provide the desired operation for maintaining a substantially constant line tension.

The winding 7 of the winch motor 5 can be connected to the variable-frequency AC source 8' only by the switch 9' representing rotation of the motor and winch 4 in a reeling-in direction. More specifically, the motor cannot be connected to the variable-frequency AC source in a direction to pay out line, although, as will be discussed hereinafter, if sufficient tension is exerted on the line 2 the winch 4 and winch motor 5 not only can be stopped but can be turned by the line tension in a reverse or overhauling direction to enable line to be unreeled from the drum of winch 4 even though torque is being applied continuously to that drum by the motor 5 tending to reel in the line.

Whether the motor 5, when the switch 9' is closed, will turn winch 4 in a direction to reel in line 2, or will be stopped, or actually will be turned reversely so that winch 4 will pay out line 2, depends upon the degree of torque exerted by the motor on the winch drum. Such torque, in turn, depends upon the power consumed by the motor and the amount of power consumed is governed by the amount of resistance 12' in the connections between the coils of the rotor 11. The greater the amount of resistance the less current will flow, the less will be the power absorbed by the motor and the smaller will be the torque developed by the motor.

As in the operation of the motor 5 when it is connected to the constant-frequency AC supply 8, it is also desirable to be able to alter the amount of resistance in the connections of rotor 11 when the motor is connected to the variable-frequency AC source 8'. The same resistance-adjusting mechanism can be used for altering the amount of the resistances 12' between the rotor coils 11 and the bridging wires 12" when current is supplied to the motor from the source 8'. Altering the amount of effective resistance in the connections between the rotor windings will, however, not have as great an effect on the torque exerted by the winch motor when it is connected to the variable-frequency AC source 8' as when the motor is connected to the constant-frequency source 8 because the power consumed by the motor depends not only on the resistance in the rotor circuit, but also on the frequency and voltage applied to the stator winding 7.

As indicated in FIG. 1, it is desirable for the frequency of the AC source 8' to be variable in response to the mechanical torque load on the motor 5, which is reflected in the current supplied to the stator windings 7. As the mechanical torque load on the motor increases and the stator current increases, it is desirable for the frequency of the current supplied to the motor to drop so as to enable the motor 5 to have the type of operating characteristics desired, namely, characteristics of high torque but low speed. Consequently, it is preferred that the maximum frequency of the variable-frequency source 8' be considerably lower than the frequency of the constant-frequency source 8. Instead of being 60 cycles per second, therefore, the maximum frequency of the source 8' can, for example, be half that value, namely, 30 cycles per second. As the mechanical torque load increases on the mooring winch and motor, the frequency can be reduced progressively with increase in load to a value in the range of 15 to 20 cycles and the input voltage can drop from 220 volts to 120 or 130 volts, for example, while the current increases.

While the load-responsive variable-frequency AC source 8' can be of various types, FIG. 1 illustrates such a power source which has proven to be quite satisfactory. Such source is a motor-generator set, including a polyphase phase-wound induction machine powered to operate as a motor 13 connected to drive an alternator 14. The stator windings 15 of such motor can be connected by a switch 16 to the ship power supply 8, such as three-phase 60-cycle current having 440 voltage. The coils of rotor 17 are interconnected through switch 36 by wires 18 having in them resistances 18'. The degree of effective resistance be be selected or adjusted for calibration purposes by bridging wires 18" which can be set so that under no load the alternator 14 will be turned at the speed of 600 r.p.m. to produce 30-cycle alternating current.

The coils of the alternator rotor 19 must be excited so as to magnetize the rotor for developing electricity in the stator windings 20 connected to the output line 21. Excitation current is supplied to the coils of the alternator rotor 19 from a DC source 22 which, conveniently, may be rectified AC. Increase in electrical loading of the alternator reflected by an increase in current passing through the output leads 21 to the winch motor 11, because of the increase in mechanical torque load on such motor and the winch 4, will tend to reduce the speed of the alternator. Reduction in speed of the alternator would result in a decrease in output voltage and a reduction in frequency. The reduction in frequency would correspond directly to the reduction in alternator rotor speed.

An increase in load on mooring line 2 resulting from a tendency of the ship to move away from the mooring bollard 3 increases the mechanical torque load on the winch 4 and winch motor 5 so as to increase the demand for current flowing through the stator coils of such motor which are continuously connected to the variable-frequency AC source 8' while the ship is being maintained in moored condition. Such increase in current must be supplied from the output loads connected to the stator windings 20 of alternator 14 so as to increase the electric power load on the alternator. As such output current load increases, it is desirable for the output frequency of alternator 14 to decrease, which can only result from a decrease in alternator speed. Such decrease in alternator speed can only result from a decrease in speed of the motor driving the alternator which, in the case of FIG. 1, is the motor 13, caused by an increase in the mechanical torque load on such motor resulting from the increased electrical load on the alternator 14 to which it is drivingly connected.

A characteristic of a polyphase phase-wound induction motor is that its speed is reduced as the mechanical torque load on it is increased and, consequently, such a motor is suitable for driving the alternator 14 to maintain a substantially constant tension on the winch line when such line is attached to the bollard 3 or other object. When the line is cast off, however, it is desirable to be able to increase the speed of the winch motor 5 and the winch 4 to reel in the slack line very quickly to prevent the trailing line from being fouled in propellers or bow thrusters or from becoming snagged. The present invention provides an arrangement which will enable motor 5 to be rotated in a reeling-in direction at approximately twice the speed that such motor would turn if its field 7 were connected directly to the 440-volt power supply line 8 by opening switch 9' and closing switch 9.

The mechanism to accomplish such high-speed reeling in rotation of winch motor 7 includes an alternating current three-phase squirrel cage induction motor 34, having its shaft permanently connected to the shaft of rotor 17 of the polyphase phase-wound induction motor 13. The stator of motor 34 can be connected to the 440-volt, 60-cycle supply line 8 by a three-pole switch 35. Three additional switches are provided, namely, switch 36 between the rotor winding 17 of motor 13 and the resistances of the resistance grid bank 18', switch 37 between the stator winding 15 of motor 13 and the supply line 8, but in reversed phase relationship to switch 16, and switch 38 for connecting leads 39 from the rotor winding 17 of motor 13 to leads 40 connected to the stator windings 7 of winch motor 5.

The key to the high-speed drive of winch motor 5 resides in the two factors that, first the speed of the polyphase, phase-wound induction-type motor 5 varies generally in proportion to the frequency of the alternating current supplied to it for a given voltage, and, second, the polyphase phase-wound induction machine 13 is capable of being supplied with electricity to operate as a motor and, alternatively, is capable of being driven mechanically to operate as an alternator.

During constant-tension operation of the system, as has been explained above, the switch 16 will be closed to supply 60-cycle alternating current from the supply line 8 to the stator winding 15 of the electrical machine 13, so as to drive its rotor 17 electrically as a motor for turning the rotor 19 of alternator 14. Such rotation of the alternator rotor will effect generation of alternating current in the field winding 20, which will be supplied through the closed switch 9' to the field winding 7 of the winch motor 5. During such operation rotation of the rotor 17 will correspondingly rotate the rotor of motor 34 under virtually no load.

When it is desired to convert the operation of motor 5 from a constant-tension operation to a high-speed reeling-in operation, switch 16 is opened to deenergize motor 13 and switch 9' is opened to remove all electrical load from the alternator 14, so that its rotor 19 can be turned idly conjointly with rotor 17 of machine 13. Switch 36 is then opened, and switch 38 is closed to connect leads 39 and 40 together, so that the stator winding 7 of motor 5 is substituted for the resistive load 18' on the windings of rotor 17. Under these conditions no power is supplied to the winch motor 5.

Closing of the switch 16 would tend to turn rotor 17 in the clockwise direction indicated by the arrow. Closing of reversing switch 37, on the other hand, would tend to turn the rotor 17 in the opposite or counterclockwise direction. If switch 35 is closed at the same time, however, the squirrel-cage motor 34 will actually effect rotation of rotor 17 of electrical machine 13 in the clockwise direction.

While a squirrel-cage induction motor is not a synchronous motor, it is virtually a constant-speed motor in that its speed is reduced only slightly at full load over its speed under no load. Consequently, the electrical field in the stator winding 15 of the electrical machine 13 is rotating in a counterclockwise direction at approximately the same speed that the rotor windings 17 are being rotated mechanically in the clockwise direction. Since both of these rotations are the result of 60-cycle alternating current input, current will be generated in the windings of the rotor 17 at a frequency equal to the algebraic sum of the rotating electrical field and the rotating rotor windings, or approximately 120 cycles. By impressing the 120-cycle alternating current generated by the windings of rotor 17 onto the stator windings 7 of the motor 5, such motor will rotate in the reeling-in direction at approximately twice the speed at which it would rotate if switch 38 were open and switch 9 were closed, connecting the stator directly to tne ship supply line 8.

To accomplish the generation of alternating current at double frequency by the windings of rotor 17, it is necessary for the induction motor 34 and the electrical machine 13 to be matched eo that the nominal speed of the induction motor is approximately equal to the synchronous speed at which the rotor 17 would be turned in the clockwise direction if switch 16 were closed, or in the counterclockwise direction if switch 37 were closed. A representative speed would be 900 rpm. It will be noted that it is necessary to stop the electrical machine 13 in order to convert from the constant-tension type of operation to the high-speed reeling-in operation if the switch 35 is closed before the switch 16 is opened and the switch 37 is closed.

For constant line tension operation the rotor 17 of the electrical machine 13 would be rotating in the clockwise direction the same as it would be rotating when driven by motor 34 during high-speed reeling-in. Consequently, there would be no appreciable mechanical shock in changing from one type of operation to the other. Also, torque is applied to the winch motor winding 7 in the reeling-in direction under constant-tension operation, so, if the line 2 were cast off, the motor 5 would begin to pick up speed in the reeling-in direction. Substitution of power generated by the coils of rotor 17 for power generated by the stator coils 20 of alternator 14 would simply accelerate the winch motor 5 to the high-speed reeling-in condition more rapidly, because the motor would be operating under light load.

With the mechanism illustrated in FIG. 1, therefore, a choice of four types of operation is available, namely, first, conventional reeling-in operation by connecting stator windings 7 to power supply 8 by closing switch 9; second, conventional paying-out operation by connecting stator windings 7 to power supply 8 by closing switch 10; third, constant-tension operation by connecting stator windings 7 to the alternator 14 by closing switch 9'; and, fourth, high-speed reeling-in by connecting stator windings 7 to rotor windings 17 by closing switch 38 with switches 26, 9, 9' and 10 open when such rotor is driven positively by the squirrel-cage induction motor 34.

FIGS. 2 and 3 illustrate an adaptation of the same general type of mechanism shown as being utilized on a tug 1' in towing a barge 1'' by a line 2'. Such line is wound on a drum 4' on the stern of the tug, and has a bridle connected to towing bitts 3' on the barge. The shaft of the reversible winch motor 5 is connected to the drum 4' so that it may be turned to reel in or pay out line. The desired initial length of line can be selected by closing switch 9 or switch 10 to connect the stator 7 of the motor to the supply line 8 for effecting rotation of the motor in the reeling-in direction or paying-out direction, respectively. When the desired length of towing line has been established, the switch 9 or 10 is opened, and the switch 9' is closed to connect the stator coils 7 of the winch motor to the output lines 21 connected to the stator coils 20 of the alternator 14. By driving the rotor 19 of the alternator by the rotor 17 of the polyphase phase-wound induction motor 13, a substantially constant tension can be maintained in the towing line 2' despite uncoordinated pitching and heaving of the tug and barge resulting from heavy weather.

In towing operations, however, it is also desirable to maintained the length of the towing line 2' substantially constant within reasonable limits, although it is much more important that the tension forces in the line be maintained substantially constant rather than the length of the line being kept constant. The present invention includes a provision for maintaining the length of the tow line constant within reasonable limits, as well as preventing substantial fluctuations in the towline tension. For this purpose a scope or line-length sensor 39 is connected to the winch drum 4'.

The essential component of the scope sensor 39 is a rheostat which is adjusted automatically from a selected value in response to rotation of the winch drum 4'. The winch drum and rheostat are connected by suitable gearing, or other suitable mechanical connection, so that as the drum turns in the reeling-in direction the resistance will be increased, whereas when the line pays out the resistance will be decreased. This resistance is connected by leads 42 and 43 in the circuit between the motor field 19 and the DC rotor field excitation current source 22. In addition, a manually adjustable rheostat 40 is connected by leads 41 and 42 in series with the scope sensor rheostat 39.

When the desired length of towline 2' has been selected, the manually adjustable rheostat 40 is turned until the tension in towline 2' has been established which will maintain the desired length of towline under smooth towing conditions for the particular barge, barge load and towing speed. If the weather or seas tend to separate the tug and the tow, the towing line will lengthen. The scope sensor will be actuated automatically in response to paying-out rotation of the drum 4' to decrease the resistance of the rheostat 39, so that a larger excitation current will flow to the rotor 19 of the alternator, causing a higher voltage output from the stator winding 20, resulting in the winch motor 5 developing a greater torque without the torque of the winch and the pull on the line being decreased appreciably before such greater torque is developed.

The greater torque applied by the winch motor 5 to the drum 4' will, of course, increase the tension in towing line 2' somewhat, tending to reel the line in. Such increase in line tension will, however, be gradual and progressive rather than abrupt. As the line is reeled in, the rheostat of the scope sensor will be adjusted automatically to increase the resistance of the rheostat 39 again to its initial value as the towing line is restored to its original length.

Conversely, if the towing line should tend to slacken, the winch drum 4' will rotate in the reeling-in dirction which will turn the scope sensor rheostat 39 in the direction to increase the resistance in the rotor field excitation circuit. Such increase in resistance will decrease the excitation current, causing the output voltage from the stator windings 20 to be reduced. The resultant reduction in torque applied by the winch drum motor 5 to the winch drum will enable the towing line 2' to pay out until the scope sensor rheostat again has been adjusted to its initial resistance value. The more the towing line varies in length, of course, the greater will be the adjustment of the scope sensor rheostat 39, and the alteration in torque on the winding drum 4' effected by the motor 5 will vary correspondingly. Consequently the greater the change in length of the towing line which is effected, the greater will be the alteration in tension of the towing line in a sense tending to restore the line to its original length.

In addition to adjusting the tension of towing line 2' automatically to induce restoration of the initial towing line length, a visual or audible alarm can be provided to be actuated by movement of the rheostat 39 to increase or to decrease the resistance more than a predetermined amount. The pilot is thus alerted to the presence of altered operating conditions so that he can supplement the effect of the scope sensor 39 by manually adjusting rheostat 40. While not shown in FIGS. 2 and 3, this system can be equipped with the high-speed reeling-in accessory shown in FIG. 1.

While FIGS. 1, 2 and 3 show representative circuit diagrams, the relationship of physical components of the system is portrayed to better advantage in FIG. 4. The ship's power supply 8 can be connected to a main control panel 24 containing suitable fuses and, perhaps, switches 9 and 10. The automatic control panel 25 may be connected to the main control panel which, in turn, is also connected to the winch motor 5 and the brake 6. To such automatic control panel is connected the alternator 14 by a circuit 21. The alternator drive control 26 is connected to the motor 13 and may include the switches 16 and 37. The resistance grid bank 12' for the winch motor is connected to the automatic control panel 25 and the calibrating resistance grid bank 18' for the alternator drive motor, if it is of the phase-wound inductance type, is connected to the alternator drive control panel 26.

It is desirable for the winch drive motor 5 to be capable of being controlled from a location remote from the control panels 24, 25 and 26. Consequently, it is desirable for such control panels to contain switch-actuating relays for the several switches 9, 10, 16, 37, 35, 9' and 38 and simply to extend control circuits to a suitable controller. Such remotely located controller shown in FIG. 4 includes a handle 27 for the purpose of controlling engagement of switch 9 or switch 10 and of adjusting in steps the amount of the resistances 12' effectively connected to the windings of rotor 11 through the bridging circuit 12''. The controller also has a handle 28 operable to control closing of switches 16 and 9' in sequence, or opening of switches 16, 9' and 36 and closing of switches 35, 38 and 37 in sequence.

In use, handle 27 can be swung in one direction to close switch 9 for initiating energization of the winch motor 5 with the maximum amount of resistances 12' in the circuit. Continued movement of such handle in the same direction through successive steps will reduce progressively the amount of resistance 12' effectively in the circuit of rotor 11 so as to increase the speed or torque of the winch motor. If the handle 27 is moved in the opposite direction past its central position, it will effect opening of switch 9 and closing of switch 10 to effect reversal of the direction of rotation of motor 5. Continued movement of the handle 27 in such reverse direction will progressively decrease the amount of resistance 12' effectively in the circuit of the motor rotor 11 so as to increase the speed or torque of the motor.

After the handle 27 has been restored to its central "off" position, handle 28 can be moved into a position to close switch 16 for the purpose of starting the drive motor 13 for alternator 20. When the motor is started, the handle can be moved farther into "automatic" position. Handle 27 can then be moved into the first position in which the maximum resistance 12' is included in the circuit of rotor 11 of motor 5. Next the handle can be moved step-by-step into positions in which the amount of resistance 12' in the circuit of winch motor rotor 11 is reduced progressively by effecting shifting of the bridging connections 12".

The effect of such manipulation of the controls on the operation of the winch 4 under "automatic" condition is that when the handle 27 is in the first position the winch motor 5 will drive the winch 4 to reel in line if the line pull is less than a selected value. As the line pull increases and the mechanical torque of winch 4 and winch motor 5 increases correspondingly, the speed of the motor 5 and winch 4 decreases until they are stopped at the constant tension line pull. If the line pull increases beyond that value, line will be unreeled from the winch drum.

When the controller handle 27 is set in the second position, the same type of operation ensues, except that the critical value of line pull will be altered. If the tension in line 2 should decrease below this value, the motor 5 will drive the winch 4 in a reeling-in direction until that value of line tension is reached. If the line tension should decrease above that value, line will be paid out at a speed depending upon the tension of the line until such tension has been reduced again to the critical value. If the controller is shifted to the third position, the critical value of line tension will be still higher. If the controller handle 27 is moved to the fourth position, the critical value of line tension again will be increased. In each case, the motor and winch drum will be rotated to pay out or reel in line as may be necessary to restore the selected critical value of line tension for which the controller is set.

When the apparatus is used for towing, it will be convenient to mount the controller for rheostat 40 on the remotely located controller standard as shown in FIG. 4. Such rheostat adjustment will then be readily available to the pilot for changing the output of alternator 14 to enable the length of the towing line to be increased or to decrease the length of such line, depending upon whether the towing line has shortened or lengthened excessively.

Even when the motor and winch are stopped, power is being consumed. Also, the higher the line pull and torque, the greater will be the load on the variable-frequency AC source 8' and, consequently, the lower will be the frequency and voltage. Such reduction in frequency and voltage will, of course, be the result of the reduction in speed of the motor 13 in a motor-alternator type of AC source. The power consumed when the winch motor and winch are not moving generates heat and, consequently, it may be desirable to provide suitable means for cooling the motor 5 and resistance grid banks 12' and 18' and, perhaps, the motor 13 and alternator 14. Such cooling mechanism is represented by a fan 30 shown in FIG. 4 which would be energized whenever the switch 9' is closed.

The winch motor 5, alternator drive motor 13, alternator 14, and motor 34 are all of standard construction, as are the switches 9, 10, 16, 35, 36, 37, 38 and 9'. No complex relay or circuit-breaker system is required, although relays to provide for remote control by the handles 27 and 28 are needed and normal fuses or overlaod circuit-breakers should be provided in the system, as will be apparent to person skilled in the art. No particular tolerance or variation from a selected line tension is required to effect operation of the system, but the system will maintain a steady pull on the line even if no conditions occur which would alter the line pull. If the line pull drops below the selected value, thus reducing the load on the variable-frequency AC source 8', the frequency will increase, thus automatically increasing the power available to the winch motor for expediting winding-in rotation of the winch 4 to restore the line tension to the predetermined value. Thus, the previous condition of the line tension is restored without appreciable hunting or overtravel.

Power utilized is minimum because driving movement of equipment is effected only as and when necessary to restore the selected line tension. Despite the tendency of the automatic system to maintain its stability, the selected line tension can be varied easily and instantaneously, or the automatic mechanism can be rendered inoperative and the winch motor immediately placed under manual control to effect voluntary rotation of the winch drum in either direction without reference to line pull.

I claim:

1. In line-tensioning mechanism including line-winding means connected to a towing line, an electric line-winding means motor continuously connected to supply continuous mechanical torque to the line-winding means for winding in such line whenever the mechanical torque on the line-winding means produced by the line tension tends to drop below the mechanical torque produced on the line-winding means by the line-winding means motor, an alternator connected to supply alternating electric current to said line-winding means motor continuously for producing continuous mechanical torque on the line-winding means tending to reel in line whether said line-winding means motor is stopped or is turning in the line-reeling-in direction or is turned in the line-paying-out direction by the winding means resulting from tension in the towing line, load-responsive means responsive to the electric load on said alternator resulting from the mechanical torque produced by said line-winding means motor on the line-winding means and operable to vary an electrical output characteristic of said alternator automatically in response to variation in mechanical torque exerted by said line-winding means motor on the line-winding means resulting from changes in towing line tension and corresponding variation in electric load on said alternator, variable-resistance means adjustable for altering the speed of said alternator and consequently an electric output characteristic of the power supplied by said alternator to said line-winding means motor for altering the torque of said motor on the line-winding means, line-length-sensing means connected to the line-winding means and to said variable-resistance means and always operable automatically in response to paying-out rotation of the line-winding means to effect adjustment of said variable-resistance means for increasing the speed of said alternator and thereby increasing the torque of said line-winding means motor on the line-winding means and increasing the towing line tension gradually and progressively without interruption rather than abruptly as the towing line is paid out, tending to reel in the towing line.

* * * * *